United States Patent
Nolan et al.

(10) Patent No.: US 11,122,509 B2
(45) Date of Patent: Sep. 14, 2021

(54) EXTENDING AN OPERATIONAL LIFETIME OF AN INTERNET OF THINGS (IOT) DEVICE

(71) Applicant: Intel Corporation, Santa Clara, CA (US)

(72) Inventors: Keith Nolan, Mullingar (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/424,418

(22) Filed: May 28, 2019

(65) Prior Publication Data

US 2019/0281554 A1 Sep. 12, 2019

Related U.S. Application Data

(63) Continuation of application No. 14/757,741, filed on Dec. 23, 2015, now abandoned.

(51) Int. Cl.
*H04W 52/02* (2009.01)
*H04L 12/26* (2006.01)

(52) U.S. Cl.
CPC ....... *H04W 52/0258* (2013.01); *H04L 43/065* (2013.01); *H04L 43/067* (2013.01); *H04L 43/106* (2013.01); *H04W 52/0235* (2013.01); *Y02D 30/70* (2020.08)

(58) Field of Classification Search
None
See application file for complete search history.

(56) References Cited

U.S. PATENT DOCUMENTS

| 8,830,124 B1* | 9/2014 | Akbari | G01S 19/34 342/357.74 |
| 2004/0041538 A1* | 3/2004 | Sklovsky | H04W 52/0264 320/127 |
| 2008/0086349 A1* | 4/2008 | Petrie | G08B 13/2462 705/7.11 |
| 2010/0194632 A1* | 8/2010 | Raento | H04W 64/00 342/357.25 |

(Continued)

FOREIGN PATENT DOCUMENTS

| CN | 1592296 A | 3/2005 |
| CN | 101035332 A | 9/2007 |

(Continued)

OTHER PUBLICATIONS

"Adaptive energy-efficient registration and online scheduling for asymmetric wireless sensor networks", Science Direct, Computer Networks, vol. 51, No. 12, (2007), 3427-3447.

(Continued)

*Primary Examiner* — Mariela Vidal Carpio
(74) *Attorney, Agent, or Firm* — Schwegman Lundberg & Woessner, P.A.

(57) ABSTRACT

A method and apparatus for extending an operational lifetime of an Internet of Things (IoT) device. In an example apparatus including the IoT device, the IoT device includes a communications device configured to transmit a report from a message dispatcher and a power monitor to monitor a reserve power level. An interval adjuster controls the timing of the report based, at least in part, on the reserve power level.

21 Claims, 8 Drawing Sheets

(56) References Cited

U.S. PATENT DOCUMENTS

| | | | |
|---|---|---|---|
| 2011/0082621 | A1 | 4/2011 | Berkobin et al. |
| 2012/0295650 | A1* | 11/2012 | Futaki ................. H04L 41/0631 |
| | | | 455/507 |
| 2013/0144483 | A1* | 6/2013 | Dabholkar ............ H04W 4/029 |
| | | | 701/32.4 |
| 2014/0095091 | A1* | 4/2014 | Moore ............... G01R 31/3648 |
| | | | 702/63 |
| 2014/0187235 | A1 | 7/2014 | Cai et al. |
| 2015/0153982 | A1* | 6/2015 | Berarducci .............. H04N 1/00 |
| | | | 358/1.15 |
| 2015/0295797 | A1 | 10/2015 | Kneckt |
| 2015/0323974 | A1* | 11/2015 | Shuster ............. H04M 1/72563 |
| | | | 713/320 |
| 2015/0327168 | A1 | 11/2015 | Yllasjarvi et al. |
| 2015/0334518 | A1 | 11/2015 | Hall et al. |
| 2016/0089986 | A1 | 3/2016 | Maeno |
| 2016/0191353 | A1* | 6/2016 | Lin ......................... H04L 12/28 |
| | | | 709/203 |
| 2017/0019144 | A1 | 1/2017 | Malach |
| 2017/0060226 | A1 | 3/2017 | Erad et al. |
| 2017/0188308 | A1 | 6/2017 | Nolan et al. |

FOREIGN PATENT DOCUMENTS

| | | |
|---|---|---|
| CN | 101483692 A | 7/2009 |
| CN | 102196539 A | 9/2011 |
| CN | 103299340 A | 9/2013 |
| CN | 103581884 A | 2/2014 |
| CN | 108293231 A | 7/2018 |
| WO | WO-2017112363 A1 | 6/2017 |

OTHER PUBLICATIONS

"U.S. Appl. No. 14/757,741, Examiner Interview Summary dated Apr. 5, 2018", 3 pgs.

"U.S. Appl. No. 14/757,741, Final Office Action dated Jan. 23, 2018", 24 pgs.

"U.S. Appl. No. 14/757,741, Final Office Action dated Dec. 28, 2018", 27 pgs.

"U.S. Appl. No. 14/757,741, Non Final Office Action dated May 18, 2018", 26 pgs.

"U.S. Appl. No. 14/757,741, Non Final Office Action dated Jul. 10, 2017", 21 pgs.

"U.S. Appl. No. 14/757,741, Response filed Apr. 23, 2018 to Final Office Action dated Jan. 23, 2018", 15 pgs.

"U.S. Appl. No. 14/757,741, Response filed Aug. 20, 2018 to Non Final Office Action dated May 18, 2018", 15 pgs.

"U.S. Appl. No. 14/757,741, Response filed Oct. 4, 2017 to Non Final Office Action dated Jul. 10, 2017", 11 pgs.

"International Application Serial No. PCT/US2016/063905, International Prelimi?ary Report on Patentability dated Jul. 5, 2018", 9 pgs.

"International Application Serial No. PCT/US2016/063905, International Search Report dated Feb. 23, 2017", 3 pgs.

"International Application Serial No. PCT/US2016/063905, Written Opinion dated Feb. 23, 2017", 7 pgs.

Audet, D, et al., "Scheduling recurring tasks in energy harvesting sensors", 2011 IEEE Conference on Computer Communications Workshops, Infocom Wkshps 2011, (2011), 6 pgs.

Avanes, A, et al., "Adaptive workflow scheduling under resource allocation constraints and network dynamics", Proc.VLDB Endow, vol. 1, No. 2, (2008), 1631-1637.

Ding, Y, et al., "An adaptive partitioning scheme for sleep scheduling and topology control in wireless sensor networks", IEEE Transactions on Parallel and Distributed Systems, vol. 20, No. 9, (2009), 1352-1365.

Lin, J, et al., "Energy-Efficient Distributed Adaptive Multisensor Scheduling for Target Tracking in Wireless Sensor Networks", IEEE Transactions on Instrumentation and Measurement, vol. 58, No. 6, (Jun. 2009), 1886-1896.

Tian, et al., "Energy-constrained task mapping and scheduling in wireless sensor networks", 2nd IEEE International Conference on Mobile Ad-hoc and Sensor Systems, MASS, (2005), 8 pgs.

Wang, K, et al., "Scheduling adaptive tasks in real-time systems", Proceedings—Real-Time Systems Symposium, 1994 IEEE, 206-215.

Xiao, W, et al., "Energy-efficient adaptive sensor scheduling for target tracking in wireless sensor networks", Journal of Control Theory and Applications, vol. 8, No. 1, (2010), 86-92.

Yang, Z, et al., "Practical scheduling algorithms for concurrent transmissions in rate-adaptive wireless networks", Proceedings—IEEE Infocom, (2010), 9 pgs.

"Chinese Application Serial No. 201680068370.6, Office Action dated Nov. 24, 2020", w/Concise Statement of Relevance, 10 pgs.

* cited by examiner

700

EXTENDING AN OPERATIONAL LIFETIME OF AN INTERNET OF THINGS (IOT) DEVICE

CROSS REFERENCES TO RELATED APPLICATION

This application is a Continuation of U.S. patent application Ser. No. 14/757,741 filed Dec. 23, 2015, the contents of which are incorporated herein in their entirety.

TECHNICAL FIELD

The present techniques relate generally to Internet of Things (IoT) devices. More specifically the present techniques relate to devices that can schedule messaging based on battery power

BACKGROUND

It has been estimated that the Internet of Things (IoT) may bring Internet connectivity to 50 billion devices by 2020. For organizations, the fault management of these devices in terms of detecting and diagnosing abnormal operations on specific devices may be of great importance. Maximizing the operational lifetime and uptime of the devices and their services may require the intelligent use of operational data in the device. For example, as devices may not be connected to power grids, controlling power drains may be important to improve battery and device life.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The internet of things (IoT) is a concept in which a large number of computing devices are interconnected to each other and to the Internet to provide functionality and data acquisition at very low levels. For example, IoT networks may include commercial and home automation devices, such as traffic control systems, water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data.

In addition to network loading, many of the IoT devices may have limited resources, e.g., with constraints on their memory size, computing power, communication capabilities, and available power, among others. The operating lifetime and uptime of an IoT device may be adversely affected by these issues due to insufficient memory and storage space, overheating, lack of power, and loss of connectivity, among others.

The transmission of messages from the wireless IoT device to a coordinator, such as a gateway or core network, is an important function of a wireless IoT device. As an example, instrumentation software packages in IoT devices generally report data on regular intervals during normal operation. The IoT device may be located in a high importance area, such as a traffic monitoring and control system. Accordingly, the IoT device should operate for as long as possible on its own power source.

In power constrained IoT sensor devices, sending data, for example, through a wireless transceiver, may consume a large part of the available energy budget. Further, a power constrained IoT device may use an intermittently powered charging device, such as a solar panel, a wind turbine, or a water turbine, to charge a battery. As these devices may provide potentially dynamic and volatile energy levels, communicating data while balancing the available reserve power may be a challenge.

The techniques described herein may address the current deficiencies by enabling the IoT devices to dynamically adapt the rate of energy usage in accordance to the available energy remaining. Accordingly, IoT devices may monitor resources and control certain actions, such as intervals between dispatching reports, reading sensors, performing calculations, and the like, to decrease the probability of resource exhaustion issues. The operating lifetime of power constrained IoT devices may be extended by automatically adapting the rate at which energy intensive tasks are scheduled based, at least in part, on the available reserve power.

In one embodiment, periodic measurements of the available battery power may be used to dynamically vary the intervals between the sending of reports. For example, an exponential function may be used to increase the interval between reports as the reserve power levels decrease.

Figure 1:
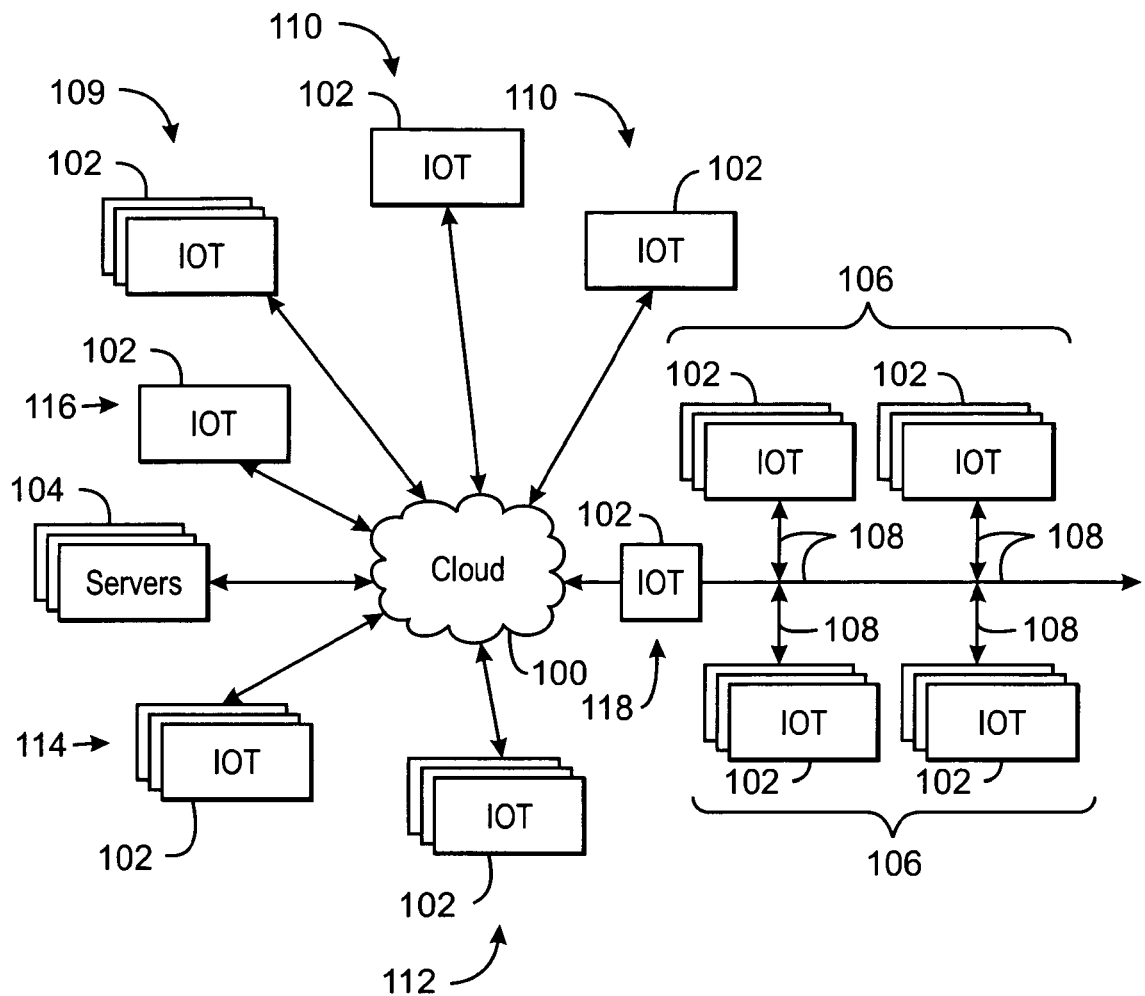
FIG. 1 is a drawing of a cloud computing network in communication with a number of Internet of Things (IoT) devices, at least some of which are communicating with servers.

FIG. 1 is a drawing of a cloud computing network 100 in communication with a number of Internet of Things (IoT) devices 102, at least some of which are communicating with servers 104. The cloud computing network 100 may represent the Internet, or may be a wide area network, such as a proprietary network for a company. The IoT devices 102 may include any number of different types of devices, grouped in various combinations. For example, a pipeline group 106 may include IoT devices 102 along pipelines that are in communication with the cloud computing network 100 through a sub-network 108, such as a local area network, wireless local area network, and the like. The IoT devices 102 in the pipeline group 106 may communicate with a server 104 through the cloud computing network 100.

Other groups of IoT devices 102 may include remote weather stations 109, local information terminals 110, alarm systems 112, automated teller machines 114, and alarm panels 116, among many others. Each of these IoT devices 102 may be in communication with other IoT devices 102, with servers 104, or both. The IoT devices 102 may use another IoT device 102 as a constrained gateway 118 to communicate with the cloud.

In addition, many of the IoT devices 102 may be located in remote or outdoor sites, making access to power grids inconvenient or expensive. For example, the IoT devices 102 of the pipeline group 106 may be located along a pipeline that travels for many miles through rural areas. Weather stations 109 may also be located in rural or relatively inaccessible locations, such as mountaintops or unmanned platforms. Accordingly, the IoT devices 102 may use environmentally powered devices, such as solar panels, wind turbines and the like, to maintain a charge in a battery and power the unit. The battery may keep the device functioning during periods when the environmentally powered charging device is not functioning, such as after dark or in cloudy conditions for solar panels.

However, as described herein, the operating lifetime of power constrained IoT devices 102 may be reduced if the rate at which energy intensive tasks are perform remains constant. However, reporting data consumes power for transmission of packets, for example, to establish and maintain network communications. If the reserve power levels in the IoT device is low, the regular reporting of data may exhaust the remaining power, forcing a shutdown.

Accordingly, having an IoT device 102 that adjusts the interval for sending reports, or other energy-intensive tasks, based on the reserve power level may extend the operational lifespan of the IoT device 102. Further, the adjustment may allow the IoT device 102 to continue to provide reports for a longer period of time before the reserve power level drops below operational limits.

Figure 2:
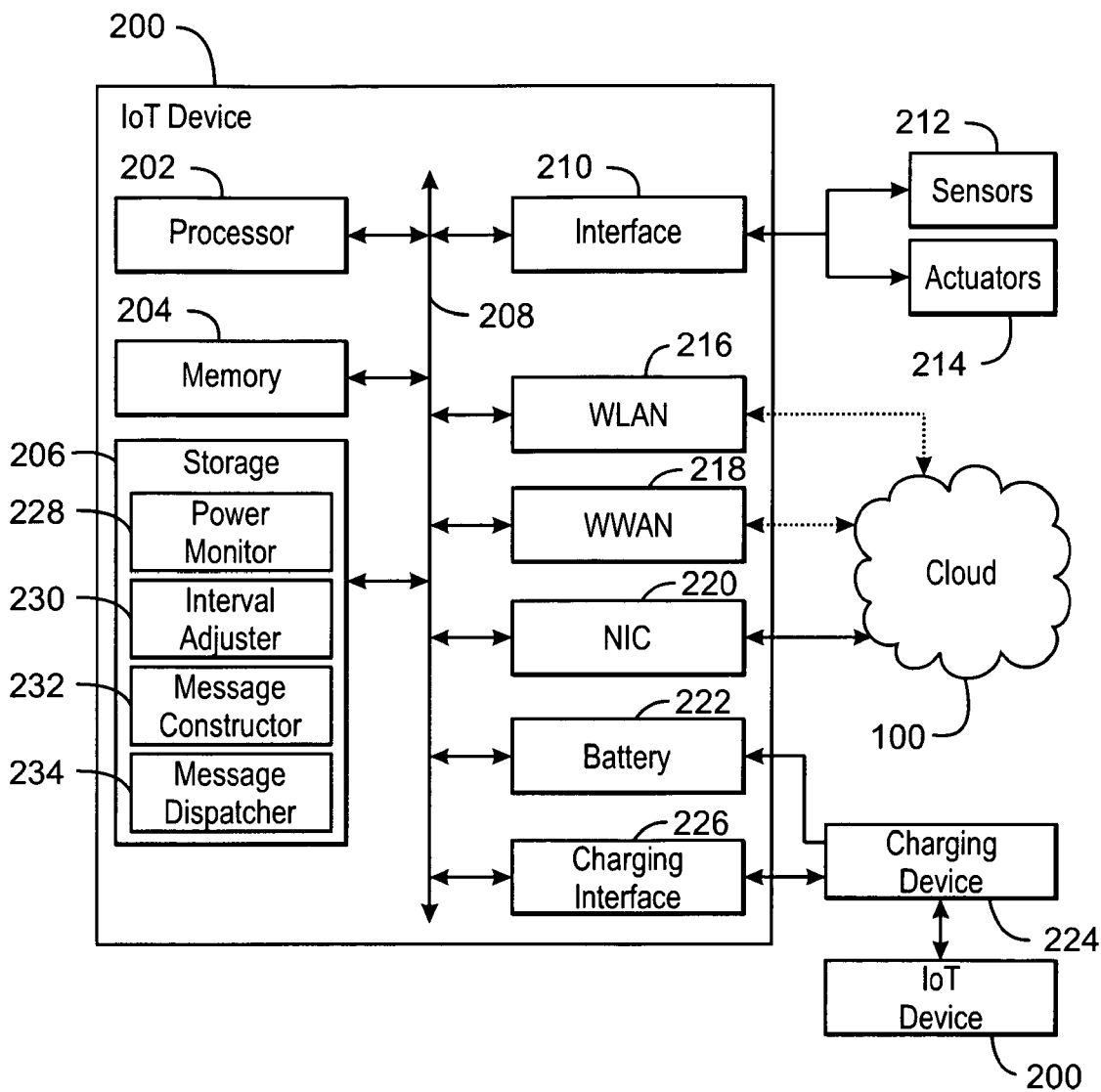
FIG. 2 is a block diagram of components that may be present in an IoT device used for self-monitoring and event reporting.

FIG. 2 is a block diagram of components that may be present in an IoT device 200 used for self-monitoring and event reporting. Like numbered items are as described with respect to FIG. 1. The IoT device 200 may include any combinations of the components. The components may be implemented as ICs, portions thereof, discrete electronic devices, or other modules, logic, hardware, software, firmware, or a combination thereof adapted in the IoT device 200, or as components otherwise incorporated within a chassis of a larger system. The block diagram of FIG. 2 is intended to show a high level view of components of the IoT device 200. However, some of the components shown may be omitted, additional components may be present, and different arrangement of the components shown may occur in other implementations. The IoT device 200 may be a traffic monitor, a remote weather station, a programmable logic controller (PLC) or remote terminal unit (RTU) in a SCADA (supervisory control and data acquisition) network, an alarm system device, a smart television, a cellular telephone, or any number of other IoT devices 102 as discussed with respect to FIG. 1.

As seen in FIG. 2, the IoT device 200 may include a processor 202, which may be a microprocessor, a multi-core processor, a multithreaded processor, an ultra-low voltage processor, an embedded processor, or other known processing element. The processor 202 may be a part of a system on a chip (SoC) in which the processor 202 and other components are formed into a single integrated circuit, or a single package. As an example, the processor 202 may include an Intel® Architecture Core™ based processor, such as a Quark™, an Atom™, an i3, an i5, an i7, or MCU-class processors, or another such processor available from Intel® Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 processor from Apple® Inc., a Snapdragon™ processor from Qualcomm® Technologies, Inc., or an OMAP™ processor from Texas Instruments, Inc.

The processor 202 may communicate with a system memory 204. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, for example, LPDDR3 or LPDDR4 that extends LPDDR2 to increase bandwidth, among others. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, one or more operating systems and so forth, a mass storage 206 may also couple to the processor 202. To enable a thinner and lighter system design the mass storage may be implemented via a solid state disk drive (SSDD). However, the mass storage may be implemented using a micro hard disk drive (HDD) in some IoT devices 200. Further, any number of new technologies may be used for the mass storage 206 in addition to, or instead of, the technologies described, such resistance change memories, phase change memories, holographic memories, or chemical memories, among others. For example, the IoT device 200 may incorporate the 3D XPOINT memories from Intel and Micron. The mass storage 206 may be combined with the memory 204 in some embodiments.

The components may communicate over a bus 208. The bus 208 may include any number of technologies, including industry standard architecture (ISA), extended ISA (EISA), peripheral component interconnect (PCI), peripheral component interconnect extended (PCIx), PCI express (PCIe), or any number of other technologies. The bus 208 may be a proprietary bus, for example, used in a SoC based system. Other bus systems may be used, such as the I2C interface, SPI interfaces, and point to point interfaces, among others.

The bus 208 may couple the processor 202 to an interface 210 that is used to connect external devices. The external devices may include sensors 212, such as traffic sensors, flow sensors, temperature sensors, motion sensors, wind speed sensors, pressure sensors, barometric pressure sensors, and the like. The interface 210 may be used to connect the IoT device 200 to actuators 214, such as traffic lights, traffic cameras, cameras, valve actuators, lock solenoids, audible sound generators, visual warning devices, and the like.

While not shown, various input/output (I/O) devices may be present within, or connected to, the IoT device 200. For example, a display may be included to show information, such as sensor readings or actuator position. An input device, such as a touch screen or keypad may be included to accept input.

The IoT device 200 can communicate with a computing cloud computing network 100 in a variety of manners, including wirelessly. In the embodiment shown in FIG. 2, various wireless modules, each of which can correspond to a radio configured for a particular wireless communication protocol, may be present. As used herein a cloud computing network 100 may be a wide area network, the Internet, or any number of other computing networks. As seen in FIG. 2, a wireless local area network (WLAN) transceiver 216 may be used to implement Wi-Fi™ communications in accordance with the Institute of Electrical and Electronics Engineers (IEEE) 802.11 standard, among others. In addition, wireless wide area communications, e.g., according to a cellular or other wireless wide area protocol, such as CDMA, LTE, GSM, and the like, can occur via a wireless wide area network (WWAN) transceiver 218. The IoT device 200 is not limited to these types of radio transceivers, but may include any number of other radio communications equipment, such as transceivers compatible with the Bluetooth® standard as defined by the Bluetooth® special interest group. For example, the IoT device 200 may communicate over a wireless personal area network (WPAN) according to the IEEE 802.15.4 standard, among others.

The IoT device 200 may include a network interface controller (NIC) 220 to communicate with the cloud computing network 100 through an Ethernet interface. This may include communicating through a small wired network shared by number of IoT devices 200 that communicate with the cloud computing network 100 through a constrained gateway 118, as described with respect to FIG. 1. For example, the IoT device 200 may be part of an ad-hoc or mesh network in which a number of devices pass communications directly between each other, for example, following the optimized link state routing (OLSR) Protocol, or the better approach to mobile ad-hoc networking (B.A.T.M.A.N.), among others. The mesh network communicate with the cloud through the constrained gateway 118.

The IoT device 200 may be powered by a local power source, such as a rechargeable battery 222. The local power source may include a charging device 224 that may include solar cells, wind turbines, water turbines, or other environmentally powered devices. The charging device 224 may charge the rechargeable battery 222 to power the IoT device 200 when power from the charging device 224 is not available, such as after dark or in low wind speeds. A charging interface 226 may monitor the charging device 224 to determine when power from the charging device 224 is available. As shown in FIG. 2, if multiple IoT devices 200 are present, the charging device 224 may be used to charge batteries in each of the devices. As described herein, this may also be used to share power among the IoT devices 200 during periods of low power generation.

The charging device 224 is not limited to an environmentally powered system, but may include a charging device 224 that is coupled to a power grid. In this embodiment, the rechargeable battery 222 may be used as a backup to keep the system operational during failures of power and equipment.

As an example, an IoT device 200 may use up to 160 mA to transmit a report using an 868 MHz mesh networking transceiver. The IoT device 200 may consume only 55 uA in a sleep state. If the IoT device 200 uses a 6600 mAh rechargeable battery 222 and a solar powered charging device 224 that can supply up to 200 mA to maximize the operating lifetime, management of the energy demands, such as the interval between reports, may be important.

The mass storage 206 may include a number of modules to implement the self-monitoring functions described herein. These modules may include a power monitor 228 that monitors reserve power levels in the rechargeable battery 222, charging status from the charging device 224, and power drains, such as power usage when transmitting reports, among others. The power monitor 228 may be part of a system monitor that compares operational parameters to alert limits to determine when an alert message should be sent. The comparison may include determining when a trend indicates a breach of an alert limit may occur, such as determining that reserve power levels are decreasing, for example, due to lack of power from the charging device 224, predicting when the reserve power level will cross an alert limit, and sending out an alert message. Further, the system monitor may compare multiple operational parameters to determine when to send an alert message, for example, varying an alert limit based on another parameter. For example, the system monitor may use a temperature reading to determine when to send an alert message on a reserve capacity in the rechargeable battery 222. During colder temperatures, the alert message may be sent out at a higher reserve capacity level, as the rechargeable battery 222 may discharge faster under cold temperatures.

An interval adjuster 230 may set the interval between energy demanding actions, such as sending reports, taking measurements, and the like. The interval adjuster 230 may set the interval between actions based on the reserve power level in the rechargeable battery 222, the operation status of the charging device 224, or a combination of the two, among other parameters. For example, ambient temperature may be taken into account to adjust intervals between actions. During colder temperatures, the interval adjuster 230 may increase the interval between reports at a higher reserve power level, as the rechargeable battery 222 may discharge faster under cold temperatures.

A message constructor 232 may be used to assemble the reports, including both standard sensor readings and alert messages. Among other information, the reports may include a timestamp indicating when the measurement was taken, and a value for the measurement. In the case of an alert message, the report may include a timestamp indicating when the breach of the alert limit took place and the reserve power level at the time the alert limit was breached. If an alert limit is based on a rate of change of an operational parameter, the message may include a predicted time when the operational parameter may pass the alert limit.

A message dispatcher 234 may send the report to a coordinator, which may be another IoT device 200, or may be a server, a router, or other device. For example, the message dispatcher 234 may place the report into a message queue for a control system. Further, the message dispatcher 234 may use any number of communication techniques in addition to, or instead of the control system, such as sending the report in a text message to a mobile device, placing an automated call to a phone number, sending out an e-mail, and the like.

The IoT device 200 is not limited to including all of the blocks shown in FIG. 2. For example, some IoT devices 200 may not include the WLAN transceiver 216, or the NIC 220, such as in remote applications. Other IoT devices 200 may merely monitor the reserve power capacity in the rechargeable battery 222, without using a separate charging interface 226 to monitor operations of a charging device 224. Actuators 214 or sensors 212 may not be included if the IoT device 200 is functioning as a coordinator or network gateway for other IoT devices 200. Other units may be included in some embodiments, such as integrated temperature sensors, touch screens, displays, and the like.

The IoT device 200 may also include additional units not shown in FIG. 2. For example, the IoT device 200 may be in a location near other IoT devices 200, each using an individual battery 222, such as a field processing system along a pipeline. The battery 222 may be directly or indirectly coupled to the batteries 222 of the other IoT devices 200, for example, through the charging device 224. The IoT devices 200 may use the charging interface 226 to control this interconnection and use power from batteries 222 on other IoT devices 200. Thus, the IoT devices 200 may prioritize the functions of the IoT devices 200 to extend the lifespan of the various IoT devices 200, while maintaining the most important functions and communications. The lower priority IoT devices 200 may be placed in lower power modes to allow higher priority functions to continue.

In some examples, a sensor may use a separate battery from the battery 222 in the IoT device 200. As described above, this battery may be coupled to the battery 222 in the IoT device 200, for example, through the charging interface. In this case, the power monitor 228 may balance power usage among the sensing and communication functions to extend the life of the IoT device 200, while maintaining some level of sensing and communications.

Figure 3:
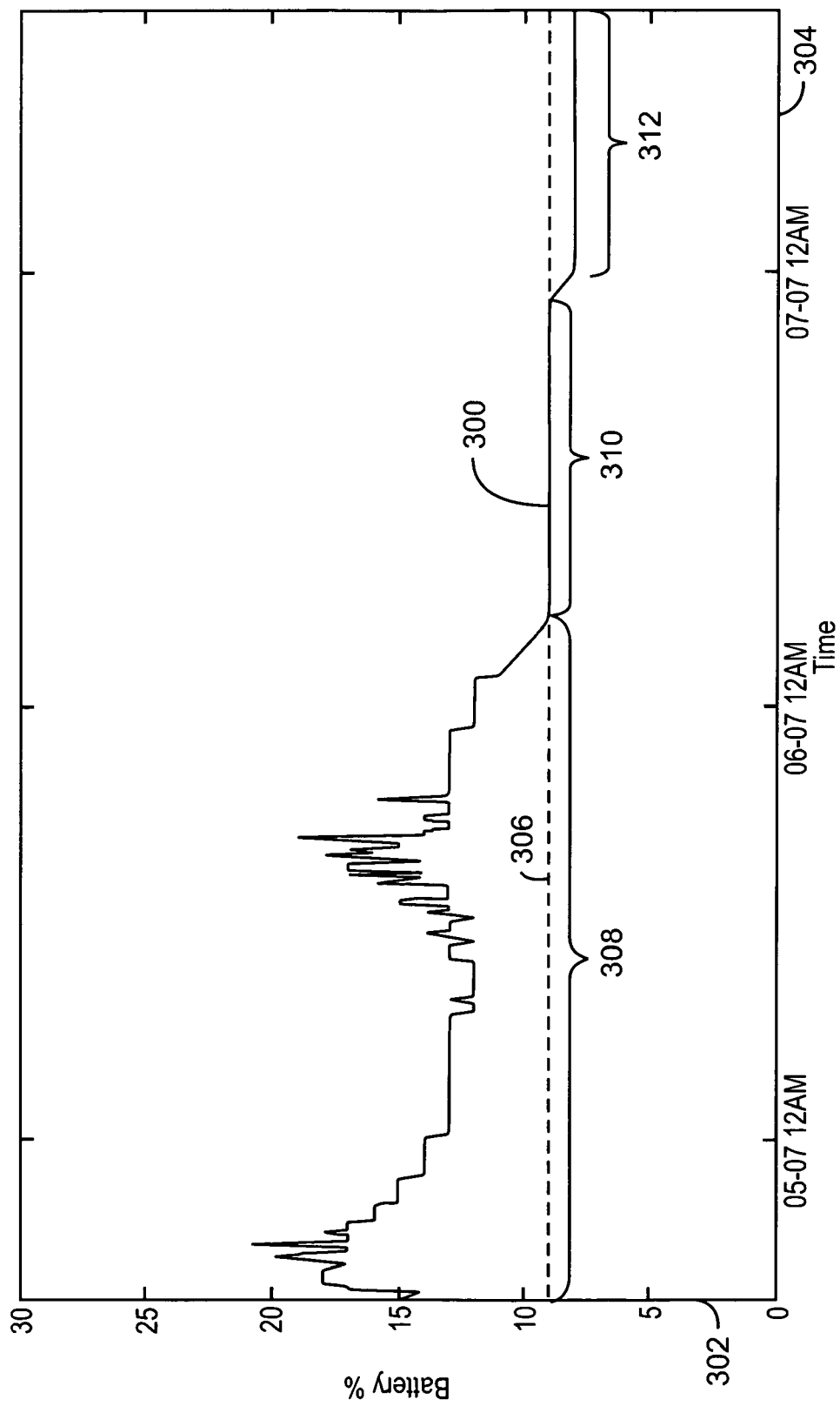
FIG. 3 is a plot of battery level over a 72 hour period.

FIG. 3 is a plot 300 of reserve power level 302 against time 304 over a 72 hour period for an IoT device. In the plot 300, it can be seen that, outside of some power spikes upwards, the reserve power level 302 is continuously dropping off. For example, a solar panel that is used to recharge the battery may not be keeping up with demand.

The IoT device may use this information to adapt its operating behavior in accordance to the available power to maximize its operating lifetime, e.g., to maintain operation overnight or to allow some reporting even when the reserve power level 302 has significantly dropped. One or more reserve power limits 306 may be selected to control the reporting intervals for the IoT device. For example, during a first period 308, the reserve power level 302 may remain above the reserve power limit 306, allowing regular reporting, as described with respect to FIG. 4. During a second period 310, the reserve power level 302 has dropped to the reserve power limit 306. During this period, reporting intervals, and intervals between other high power demand activities, may be extended to save energy. In a third period 312, the reserve power level 302 has dropped below the reserve power limit 306, and intervals may be further extended. The changes can be see for the reporting intervals in FIG. 4.

Figure 4:
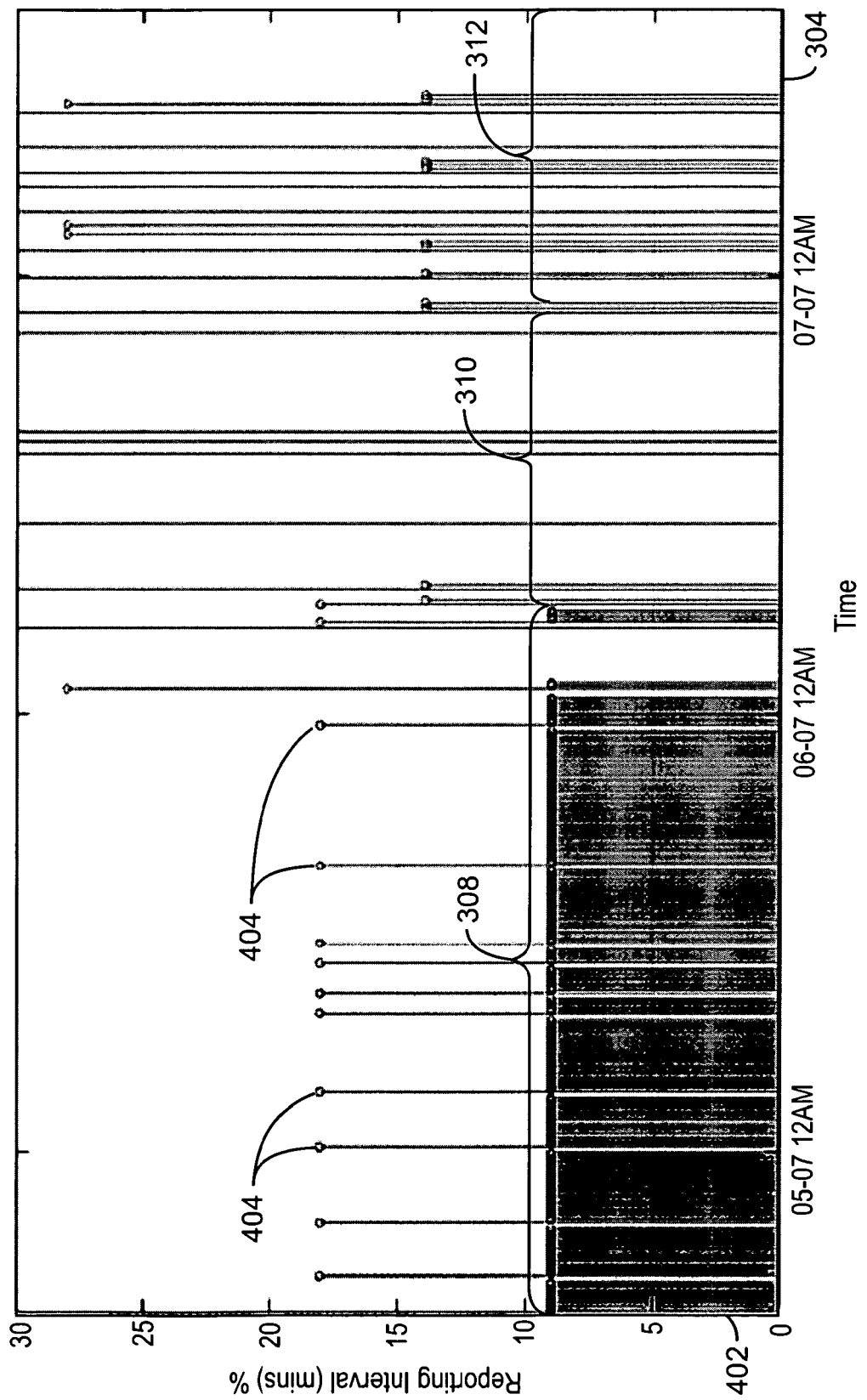
FIG. 4 is a plot of reporting interval over the 72 hour period.

FIG. 4 is a plot of reporting interval 402 against time 304 over the 72 hour period. Like numbered items are as described with respect to FIG. 3. As the plot reflect a real world case, the intervals are measured from the perspective of a receiving device or coordinator in a mesh network. Thus, the sporadic large increases in intervals are due to failed scheduled reporting attempts.

As described with respect to FIG. 3, the intervals may depend on the available battery power level. In the first period 308, regularly scheduled reports are sent, with an occasional longer interval, e.g., intervals 404, due to failed reporting attempts. Once the reserve power level 302, has fallen to or below the reserve power limit 306, for example, in periods 310 and 312, the intervals may be increased to save battery life. As the reserve power level 302 increases, the reporting intervals may be decreased, as illustrated with respect to FIG. 5.

Figure 5:
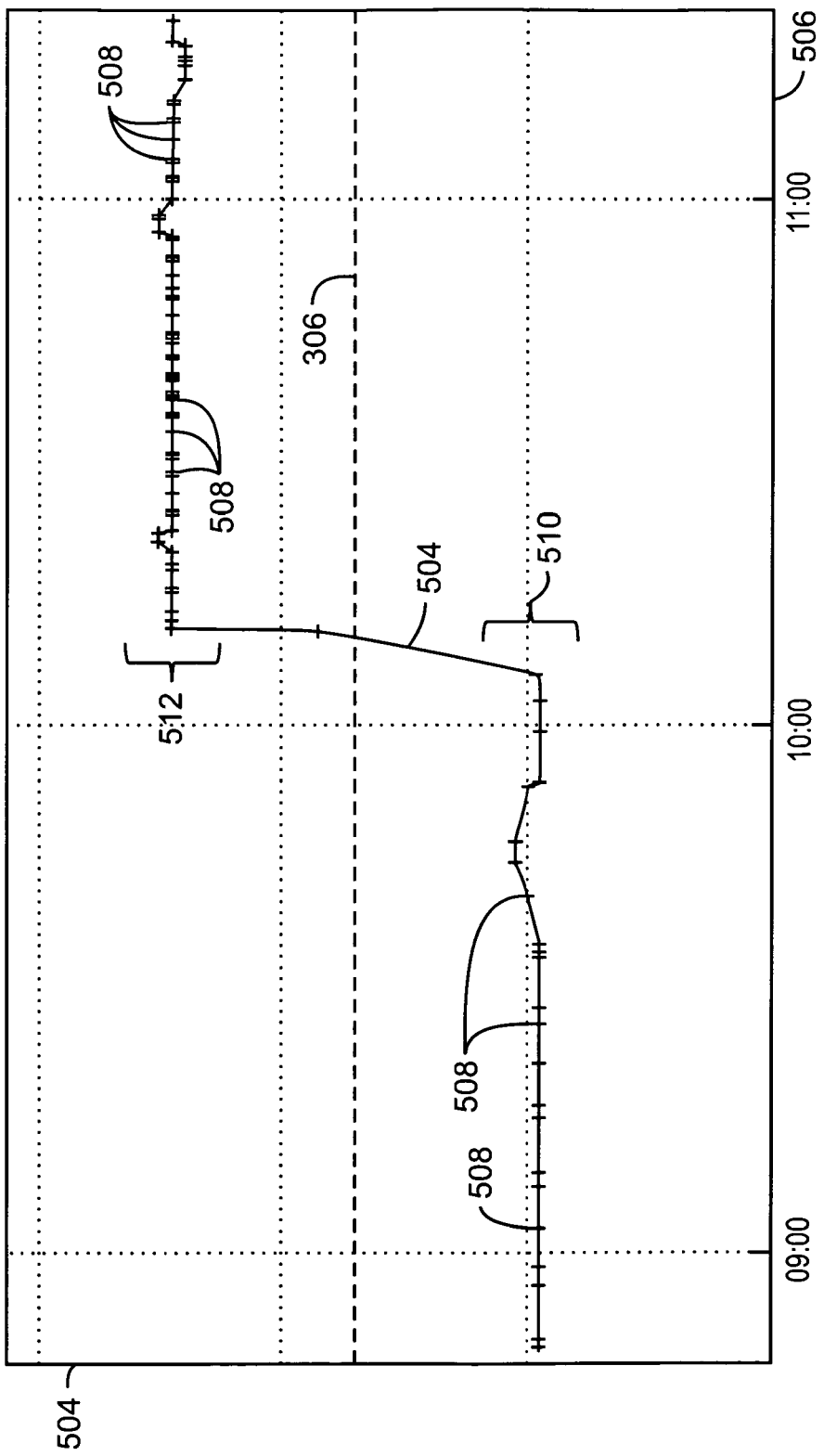
FIG. 5 is plot of battery level indicating reporting events.

FIG. 5 is plot 502 of battery level 504 against time 506, indicating reporting events, which are shown as tick marks 508. To simplify the drawing, not all tick marks 508 are labeled. Like numbered items are as described with respect to FIG. 3. The spacing between the tick marks 508 on the plot 502 denotes the reporting interval. At a lower power level 510, the intervals are further apart than at a higher battery level 512. In this illustration, there may be a reserve power limit 306 between the lower power level 510 and the higher power level 512, which allows as incremental decrease in reporting interval. However, the reporting interval, or the interval between sequential power drawing events, does not have to be controlled by a single or even a few limits, but may be a function, as described with respect to FIG. 6.

TABLE 1

Table of example battery level versus intervals between tasks

| Battery (%) | Interval (mins) |
|---|---|
| >=94 | 2 |
| 86 | 3 |
| 79 | 4 |
| 71 | 5 |
| 63 | 6 |
| 56 | 7 |
| 48 | 8 |
| 40 | 9 |
| 32 | 11 |
| 25 | 13 |
| 17 | 15 |
| 9 | 19 |
| 2 | 23 |
| <2 | 1440 |

Figure 6:
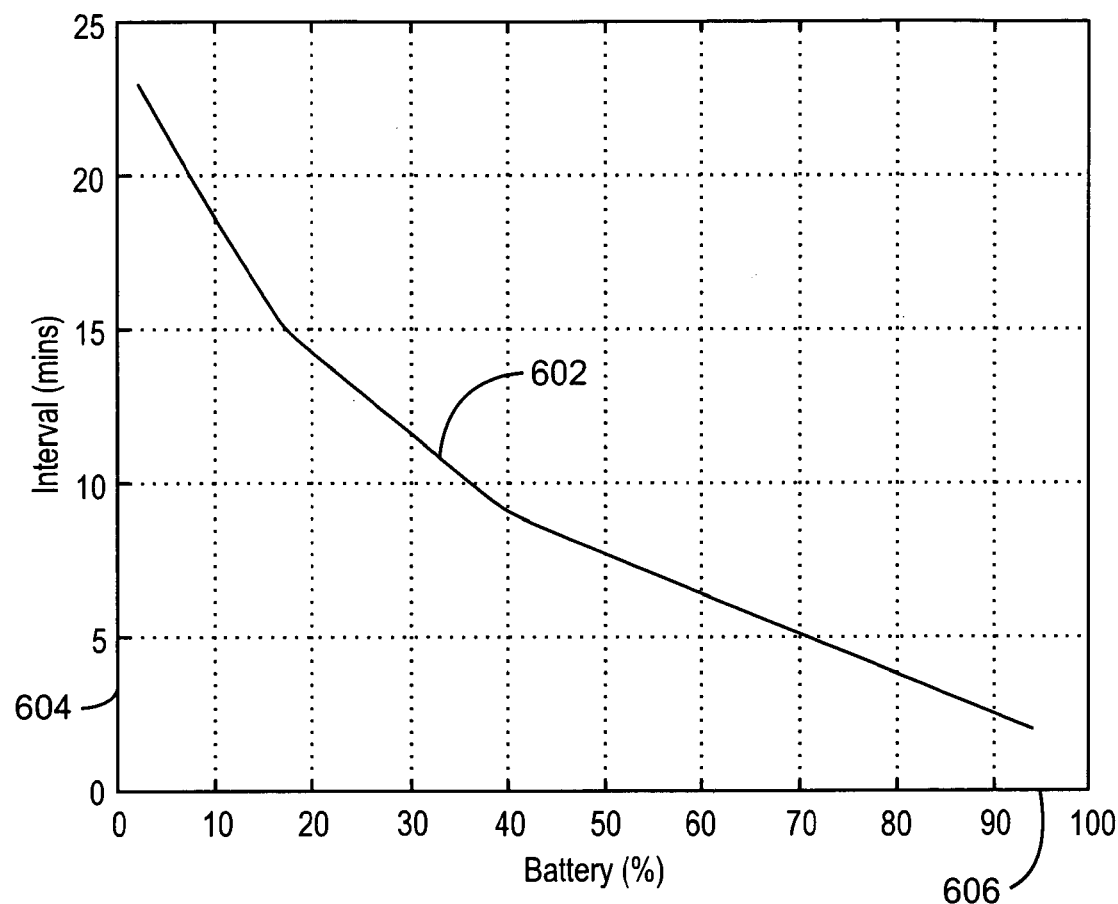
FIG. 6 is a plot of reporting interval versus battery life.

FIG. 6 is a plot 602 of reporting interval 604 against available battery power 606, illustrating a control function that may be used to adjust reporting intervals. It may be understood that similar functions may be used to adjust the interval between other energy intensive functions. As shown by the plot 602, the intervals 604 are inversely proportional to the available battery power 606. The power profile shown by the plot 602 is derived from a log process and may enable an IoT device to vary its reporting intervals from a minimum reporting interval of 2 mins and a maximum of 23 mins. Table 1 presents a numerical chart of example battery level versus reporting intervals. Table 1 also shows an additional interval state of 24 hrs for when the device power level is less than 2%. This longer interval may allow the device to recharge, which may reduce the number of occurrences of deep discharge states in order to avoid battery life shortening.

Figure 7:
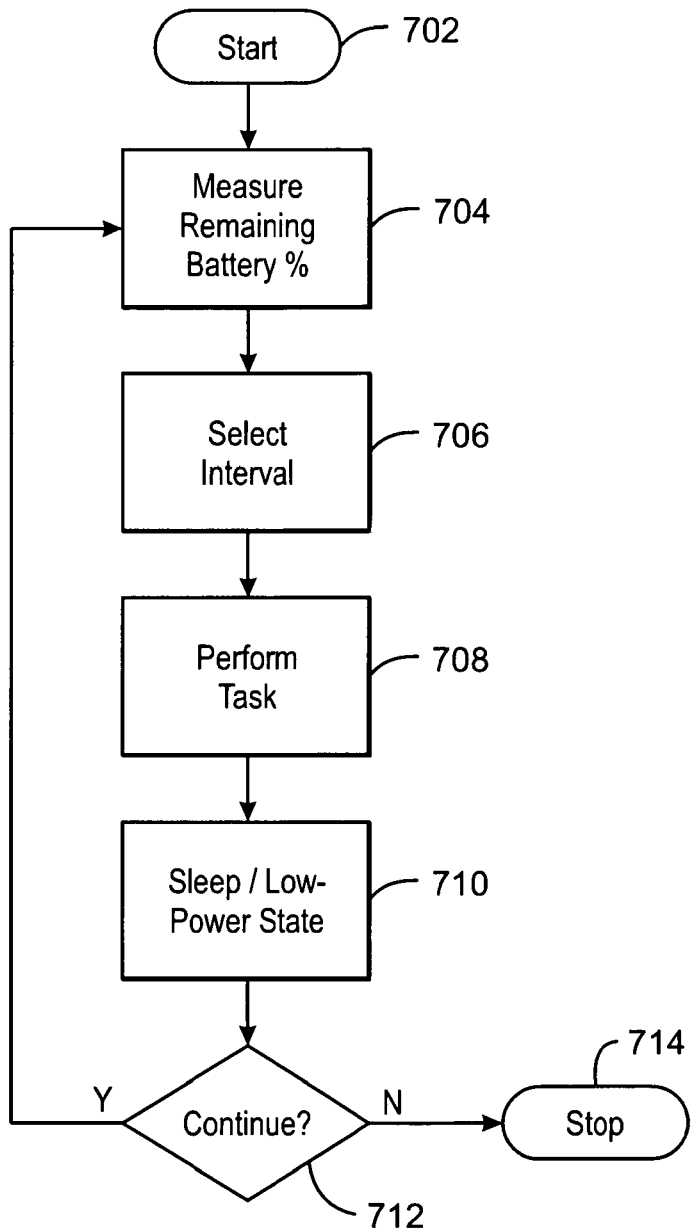
FIG. 7 is a process flow diagram of a method for controlling a reporting interval based on battery level.

FIG. 7 is a process flow diagram of a method 700 for controlling a reporting interval based on battery level. The method 700 starts at block 702, for example, when the IoT device is powered, or a battery conservation method is activated. At block 704, the IoT device measures the available reserve power level. This can be performed via a system call to measure the battery voltage using an analog to digital converter. The reserve power level can be calculated dividing the measured battery level against the rated voltage level and multiplying the result by 100 to obtain a percentage value.

At block 706, an interval for the action, such as the reporting interval, is selected based on the measured battery level. For example, the reporting interval may be derived from the power profile depicted in FIG. 6 and Table 1. At block 708, the intended operation, e.g., send a report of a sensor observation using wireless communications.

At block 710, a sleep or suspend state may be activated for the selected interval to preserve power and to allow for battery recharging, for example, if the prevailing conditions allow for adequate power to be generated. Deep discharging rechargeable batteries significantly shortens their lifetime. The system is designed to prevent power constrained IoT device batteries from reaching a deep discharge state, e.g., placing the IoT device in a 24 hour sleep state to allow for self-recharging when the available battery level reaches a critical lower threshold.

At block 712, a check to see if the system should continue. Typically, in embedded IoT devices, the operation continues indefinitely, e.g., process flow returns to block 704.

Existing power constrained IoT sensors operating on a fixed interval or scheduled basis would continue to attempt to operate on this schedule until the available battery resources are exhausted. Fixed strategy approaches, e.g., fast interval reporting or slow interval reporting are not optimal either; the former can significantly reduce the operating lifetime of the device and the latter may be reporting too infrequently to capture important sensor measurement events.

Figure 8:
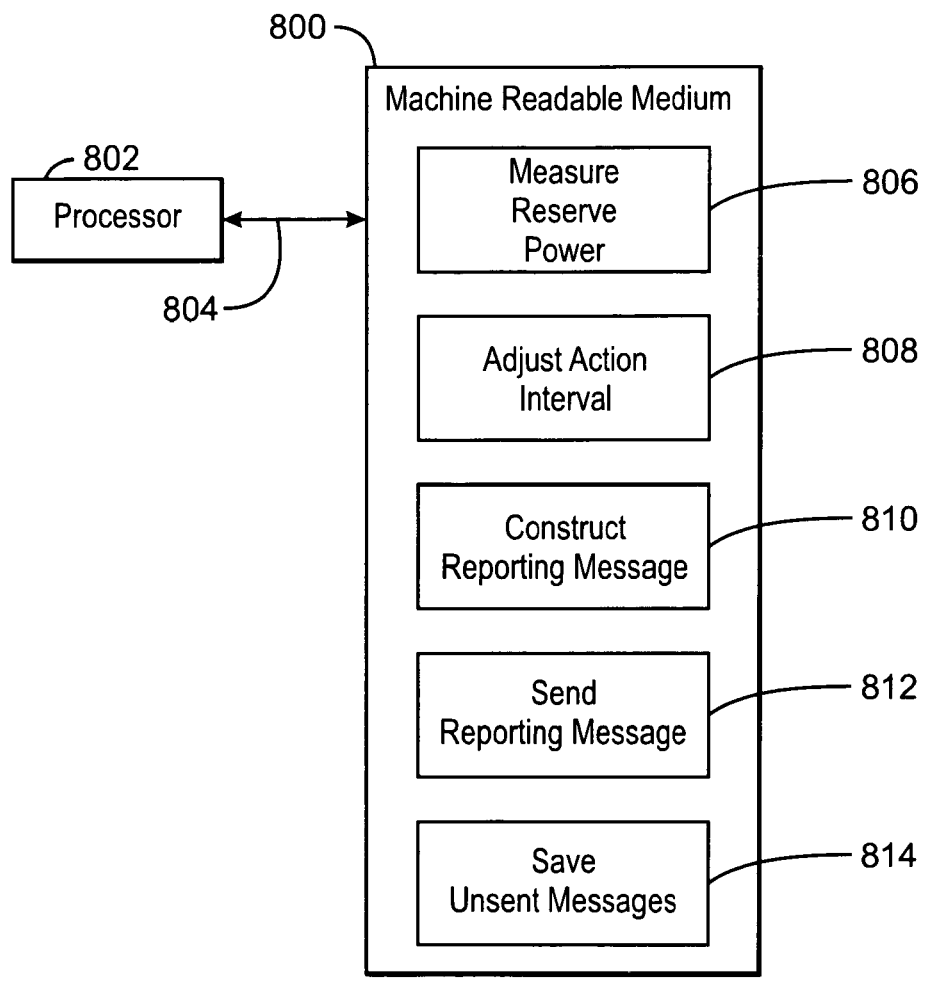
FIG. 8 is a block diagram of a non-transitory, machine readable medium including code to direct a processor to control a reporting interval for an IoT device based on a battery level.

FIG. 8 is a block diagram of a non-transitory, machine readable medium 800 including code to direct a processor 802 to control a reporting interval for an IoT device based on a battery level. The processor 802 may access the code over a bus 804, as described herein. The non-transitory, machine readable medium 800 may include code 806 to direct the processor 802 to measure a reserve power level, including, for example, whether a charging device is operational and providing current to a battery. Code 808 may be included to direct the processor 802 to adjust an interval between actions, such as reporting a message to a coordinator. Code 810 may be included to direct the processor 802 to construct a reporting message, for example, including a sensor measurement and a timestamp, among others. Further, code 810 may be included to direct the processor 802 to dispatch the reporting message to a coordinator, such as a gateway or control server. If the reserve power level is too low to dispatch frequent messages, but sensor observations may still be taken, code 814 may be included to direct the processor 802 to save unsent messages to be sent when power levels permit.

EXAMPLES

Example 1 includes an apparatus for extending an operational lifetime of an Internet of Things (IoT) device, including the IoT device. The IoT device includes a communications device configured to transmit a report from a message dispatcher, a power monitor to monitor a reserve power level, and an interval adjuster to control a timing of the report based, at least in part, on the reserve power level.

Example 2 includes the subject matter of example 1, wherein the reserve power level includes a battery level.

Example 3 includes the subject matter of examples 1 or 2, wherein the reserve power level includes a charging level from a charging device.

Example 4 includes the subject matter of any of examples 1 to 3, including: a message constructor to assemble the report; and a message dispatcher to send the report to a coordinator.

Example 5 includes the subject matter of any of examples 1 to 4, wherein the IoT device includes: a sensor interface that is coupled to a sensor; and the report includes: a value measured by the sensor; and a time stamp for the value.

Example 6 includes the subject matter of any of examples 1 to 5, including: an alert limit that includes a value for the reserve power level; and the report includes the reserve power level and a timestamp when the reserve power level falls below the alert limit.

Example 7 includes the subject matter of any of examples 1 to 6, wherein the IoT device includes an actuator interface that is coupled to an actuator.

Example 8 includes the subject matter of any of examples 1 to 7, wherein the IoT device is in a mesh network with a plurality of other IoT devices.

Example 9 includes the subject matter of any of examples 1 to 8, wherein the communications device includes a wireless local area network (WLAN) transceiver.

Example 10 includes the subject matter of any of examples 1 to 9, wherein the communications device includes a wireless wide area network (WWAN) transceiver.

Example 11 provides a method for controlling a reporting interval in an Internet-of-Things (IoT) device, including: monitoring a power level for the IoT device; and adjusting an interval between a transmission of two reports based, at least in part, on the power level.

Example 12 includes the subject matter of example 11, including increasing the interval when a reserve battery level falls below a selected limit.

Example 13 includes the subject matter of examples 11 or 12, including increasing the interval when a power level of a charging device falls below a selected limit.

Example 14 includes the subject matter of any of examples 11 to 13, including: constructing a report; and sending the report to a coordinator.

Example 15 includes the subject matter of any of examples 11 to 14, including: measuring a value from a sensor interface; constructing a report including the value and a timestamp for the measurement; and sending the report to a coordinator.

Example 16 includes the subject matter of any of examples 11 to 15, including placing the IoT device in a low power state when the power level falls below a selected limit.

Example 17 includes the subject matter of any of examples 11 to 16, including storing a report in a local storage when the power level is below a selected limit.

Example 18 provides a non-transitory, machine readable medium including code to direct a processor to: measure a value of a reserve power level for the an Internet of Things (IoT) device; and adjust a reporting interval between a transmission of two reports based, at least in part, on the value.

Example 19 includes the subject matter of example 18, including code to direct a processor to: construct a report; and send the report to a coordinator.

Example 20 includes the subject matter of examples 18 or 19, including code to direct a processor to save a report that has not been sent.

Example 21 provides an Internet of Things (IoT) device, including: a communications device configured to transmit a report from a message dispatcher; a power monitor to monitor a reserve power level; and an interval adjuster to control the timing of the report based, at least in part, on the reserve power level.

Example 22 includes the subject matter of example 21, wherein the reserve power level includes a battery level.

Example 23 includes the subject matter of examples 21 or 22, wherein the reserve power level includes a charging level from a charging device.

Example 24 includes the subject matter of any of examples 21 to 23, including: a message constructor to assemble the report; and a message dispatcher to send the report to a coordinator.

Example 25 includes the subject matter of any of examples 21 to 24, wherein the IoT device includes: a sensor interface that is coupled to a sensor; and the report includes: a value measured by the sensor; and a time stamp for the value.

Example 26 includes the subject matter of any of examples 21 to 25, including: an alert limit that includes a value for the reserve power level; and the report includes the reserve power level and a timestamp when the reserve power level falls below the alert limit.

Example 27 includes the subject matter of any of examples 21 to 26, wherein the IoT device includes an actuator interface that is coupled to an actuator.

Example 28 includes the subject matter of any of examples 21 to 27, wherein the communications device includes a wireless local area network (WLAN) transceiver.

Example 29 includes the subject matter of any of examples 21 to 28, wherein the communications device includes a wireless wide area network (WWAN) transceiver.

Example 30 includes an apparatus for extending an operational lifetime of an Internet of Things (IoT) device, including the IoT device, wherein the IoT device includes a means for controlling a timing for sending of a report based, at least in part, on a reserve power level.

Example 31 includes the subject matter of example 30, wherein the IoT device includes a means for transmitting the report.

Example 32 includes the subject matter of example 30 or 31, wherein the IoT device includes a means for monitoring the reserve power level.

Example 33 includes the subject matter of any of examples 30 to 32, wherein the apparatus includes a means for increasing a reserve power level.

Example 34 includes the subject matter of any of examples 30 to 33, wherein the IoT device includes a means for assembling the report.

Example 35 includes the subject matter of any of examples 30 to 34, wherein the IoT device includes a means for measuring an environmental variable.

Example 36 includes the subject matter of any of examples 30 to 35, wherein the IoT device includes a means for affecting an environmental change.

Example 37 includes the subject matter of any of examples 30 to 36, wherein the IoT device includes a means for interacting in a mesh network with a plurality of other IoT devices.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. At least one non-transitory machine-readable storage device having stored thereon instructions that, when executed by at least one processor of an Internet of Things (IoT) device, cause the at least one processor to perform operations, the operations comprising:
   monitoring a reserve power level of a battery associated with the IoT device,
   determining a charging status of an environmentally powered charging device coupled to the battery associated with the IoT device;
   selecting a reserve power limit of the battery associated with the IoT device;

selecting, based at least in part on the monitored reserve power level, a time interval for at least one function of the IoT device;

determining a first reporting period when the monitored reserve power level is above the reserve power limit and periodically transmit a first report, associated with the at least one function of the IoT device, at a first timing interval, wherein the first timing interval defines an amount of time which occurs between the periodic transmission of the first report;

determining a second reporting period when the monitored reserve power level is equal to the reserve power limit and periodically transmit a second report, associated with the at least one function of the IoT device, at a second timing interval, wherein the second timing interval defines an amount of time which occurs between the periodic transmission of the second report;

determining a third reporting period when the monitored reserve power level is below the reserve power limit and periodically transmit a third report, associated with the at least one function of the IoT device, at a third timing interval, wherein the third timing interval defines an amount of time which occurs between the periodic transmission of the third report;

wherein the first timing interval is shorter than the second timing interval, and the second timing interval is shorter than the third timing interval;

determining, based at least in part on a trend of the monitored reserve power level, whether a breach of an alert limit is expected to occur based on a lack of power from the environmentally powered charging device, wherein in response to determining that a breach of an alert limit will occur, sending an alert message;

determining whether an adequate amount of power is available to be generated during one of the first timing interval, the second timing interval, or the third timing interval; and in response to determining that an adequate amount of power is available to be generated during one of the first timing interval, the second timing interval, or the third timing interval, activating a sleep or suspend state for one of the first timing interval, the second timing interval or the third timing interval.

2. The machine-readable storage device of claim 1, wherein the operations further comprise:

saving at least one of the first report, the second report, or the third report when any of the first, second, or third report has not been transmitted.

3. The machine-readable storage device of claim 1, wherein the at least one function of the IoT device includes measuring a value collected by a sensor.

4. The machine readable storage device of claim 3, wherein one of the first report, the second report, or the third report includes a time stamp for the value.

5. The machine-readable storage device of claim 1, wherein the IoT device is a part of a mesh network with at least one other IoT device.

6. The machine-readable storage device of claim 1, wherein at least one of the first timing interval or the second timing interval is adjusted to adjust a transmission interval between the first report and the second report, or between the second report and the third report based, at least in part, on a value measured by a sensor.

7. The machine-readable storage device of claim 1, wherein one of the first timing interval or the second timing interval is adjusted to adjust a transmission interval between the first report and the second report, or between the second report and the third report based, at least in part, on the monitored reserve power level.

8. A method for extending the life of an internet of things (IoT) device, the method comprising:

monitoring a reserve power level of a battery associated with the IoT device, determining a charging status of an environmentally powered charging device coupled to the battery associated with the IoT device;

selecting a reserve power limit of the battery associated with the IoT device;

selecting, based at least in part on the monitored reserve power level, a time interval for at least one function of the IoT device;

determining a first reporting period when the monitored reserve power level is above the reserve power limit and periodically transmit a first report, associated with the at least one function of the IoT device, at a first timing interval, wherein the first timing interval defines an amount of time which occurs between the periodic transmission of the first report;

determining a second reporting period when the monitored reserve power level is equal to the reserve power limit and periodically transmit a second report, associated with the at least one function of the IoT device, at a second timing interval, wherein the second timing interval defines an amount of time which occurs between the periodic transmission of the second report;

determining a third reporting period when the monitored reserve power level is below the reserve power limit and periodically transmit a third report, associated with the at least one function of the IoT device, at a third timing interval, wherein the third timing interval defines an amount of time which occurs between the periodic transmission of the third report;

wherein the first timing interval is shorter than the second timing interval, and the second timing interval is shorter than the third timing interval;

determining, based at least in part on a trend of the monitored reserve power level, that a breach of an alert limit is expected to occur based on a lack of power from the environmentally powered charging device, wherein in response to determining that a breach of an alert limit will occur, sending an alert message;

determining whether an adequate amount of power is available to be generated during one of the first timing interval, the second timing interval, or the third timing interval; and in response to determining that an adequate amount of power is available to be generated during one of the first timing interval, the second timing interval, or the third timing interval, activating a sleep or suspend state for one of the first timing interval, the second timing interval, or the third timing interval.

9. The method of claim 8, further comprising:

saving at least one of the first report, the second report, or the third report when any of the first, second, or third report has not been transmitted.

10. The method of claim 8, wherein the at least one function of the IoT device is measuring a value collected by a sensor.

11. The method of claim 10, wherein one of the first report, the second report, or the third report includes a time stamp for the value.

12. The method of claim 8, wherein the IoT device is part of a mesh network with at least one other IoT device.

13. The method of claim 8, wherein one of the first timing interval or the second timing interval is adjusted to adjust a transmission interval between the first report and the second report, or between the second report and the third report based, at least in part, on a value measured by a sensor.

14. The method of claim 8, wherein one of the first timing interval or the second timing interval is adjusted to adjust a transmission interval between the first report and the second report, or between the second report and the third report based, at least in part, on the monitored reserve power level.

15. A system for extending the life of an internet of things (IoT) device, comprising:
- a processor;
- memory, including instructions stored thereon, which when executed by the processor, cause the processor to:
- monitor a reserve power level of a battery associated with the IoT device;
- determine a charging status of an environmentally powered charging device coupled to the battery associated with the IoT device;
- select a reserve power limit of the battery associated with the IoT device;
- select, based at least in part on the monitored reserve power level, a time interval for at least one function of the IoT device;
- determine a first reporting period when the monitored reserve power level is above the reserve power limit and periodically transmit a first report, associated with the at least one function of the IoT device, at a first timing interval, wherein the first timing interval defines an amount of time which occurs between the periodic transmission of the first report;
- determine a second reporting period when the monitored reserve power level is equal to the reserve power limit and periodically transmit a second report, associated with the at least one function of the IoT device, at a second timing interval, wherein the second timing interval defines an amount of time which occurs between the periodic transmission of the second report;
- determine a third reporting period when the monitored reserve power level is below the reserve power limit and periodically transmit a third report, associated with the at least one function of the IoT device, at a third timing interval, wherein the third timing interval defines an amount of time which occurs between the periodic transmission of the third report;
- wherein the first timing interval is shorter than the second timing interval, and the second timing interval is shorter than the third timing interval;
- determine, based at least in part on a trend of the monitored reserve power level, that a breach of an alert limit is expected to occur based on a lack of power from the environmentally powered charging device, wherein in response to determining that a breach of an alert limit will occur, sending an alert message;
- determine whether an adequate amount of power is available to be generated during one of the first timing interval, the second timing interval, or the third timing interval; and
- in response to determining that an adequate amount of power is available to be generated during one of the first timing interval, the second timing interval, or the third timing interval, activating a sleep or suspend state for one of the first timing interval, the second timing interval, or the third timing interval.

16. The system of claim 15, wherein the processor is further to:
- save at least one of the first report, the second report, or the third report, when any of the first, second, or third report has not been transmitted.

17. The system of claim 15, wherein the at least one function of the IoT device is measurement of a value collected by a sensor.

18. The system of claim 17, wherein one of the first report, the second report, or the third report includes a time stamp for the value.

19. The system of claim 15, wherein the IoT device is part of a mesh network with at least one other IoT device.

20. The system of claim 15, wherein one of the first timing interval or the second timing interval is adjusted to adjust a transmission interval between the first report and the second report, or between the second report and the third report based, at least in part, on a value measured by a sensor.

21. The system of claim 15, wherein one of the first timing interval or the second timing interval is adjusted to adjust a transmission interval between the first report and the second report, or between the second report and the third report based, at least in part, on the monitored reserve power level.

* * * * *

UNITED STATES PATENT AND TRADEMARK OFFICE
CERTIFICATE OF CORRECTION

PATENT NO. : 11,122,509 B2
APPLICATION NO. : 16/424418
DATED : September 14, 2021
INVENTOR(S) : Nolan et al.

Page 1 of 1

It is certified that error appears in the above-identified patent and that said Letters Patent is hereby corrected as shown below:

On the Title Page

On page 2, in Column 2, under "Other Publications", Line 10, delete "Prelimi?ary" and insert --Preliminary-- therefor In the Claims In Column 13, Line 59, in Claim 6, after "wherein", delete "at least"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*